(12) United States Patent
Tuli et al.

(10) Patent No.: US 12,464,372 B2
(45) Date of Patent: Nov. 4, 2025

(54) PROVIDING TELECOMMUNICATION NETWORK-RELATED RESOURCES TO GEOGRAPHIES BASED ON USER MOBILITY SYSTEMS AND METHODS

(71) Applicant: T-Mobile USA, Inc., Bellevue, WA (US)

(72) Inventors: Ashish Tuli, Ashburn, VA (US); Heitor Almeida, Plano, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 349 days.

(21) Appl. No.: 18/322,757

(22) Filed: May 24, 2023

(65) Prior Publication Data

US 2024/0397337 A1    Nov. 28, 2024

(51) Int. Cl.
*H04W 4/00*    (2018.01)
*H04W 16/18*    (2009.01)
*H04W 4/029*    (2018.01)

(52) U.S. Cl.
CPC ............ *H04W 16/18* (2013.01); *H04W 4/029* (2018.02)

(58) Field of Classification Search
CPC ...... H04W 16/18; H04W 4/029; H04W 4/023
See application file for complete search history.

(56) References Cited

U.S. PATENT DOCUMENTS

| | | |
|---|---|---|
| 6,047,186 A | 4/2000 | Yu et al. |
| 6,108,533 A | 8/2000 | Brohoff |
| RE38,267 E | 10/2003 | Borkowski et al. |
| 6,697,477 B2 | 2/2004 | Fleischer et al. |
| 7,181,212 B2 | 2/2007 | Hogan et al. |
| 7,363,041 B2 | 4/2008 | Bonnard et al. |

(Continued)

FOREIGN PATENT DOCUMENTS

| | | |
|---|---|---|
| CN | 1302520 A | 7/2001 |
| CN | 102752767 B | 12/2014 |

(Continued)

*Primary Examiner* — Abdelnabi O Musa
(74) *Attorney, Agent, or Firm* — Perkins Coie LLP (57) ABSTRACT

Systems and methods for providing telecommunications network-related resources to geographies based on user mobility are disclosed. The system identifies a proposed-split area that fails to satisfy a network-ready condition. The system temporarily splits the proposed-split area into a set of geographically-distinct sub-areas using a geographical constraining condition. The system obtains user mobility data indicating movement of user locations from respective geographically-distinct sub-areas to geographic locations that (i) satisfy the network-ready condition and (ii) is within a threshold distance of the respective geographically-distinct sub-area. The system determines a user-mobility metric for each geographically-distinct sub-area. The system identifies a subset of geographically-distinct sub-areas of at least one of the geographically-distinct sub-areas that satisfy the network-ready condition. The system permanently splits the proposed-split area and deploys network resources to the subset of geographically-distinct sub-areas in response to the user-mobility metrics of the subset of geographically-distinct sub-areas satisfying a user mobility threshold value.

20 Claims, 6 Drawing Sheets

(56) References Cited

U.S. PATENT DOCUMENTS

| | | |
|---|---|---|
| 7,606,583 B2 | 10/2009 | Spriestersbach |
| 7,620,402 B2 | 11/2009 | Feldman et al. |
| 7,801,897 B2 | 9/2010 | Egnor |
| 8,145,237 B2 | 3/2012 | Versteeg |
| 8,385,926 B2 | 2/2013 | Johansson et al. |
| 8,504,059 B2 | 8/2013 | Huang et al. |
| 8,526,961 B2 | 9/2013 | Sanders et al. |
| 8,634,860 B2 | 1/2014 | Huang et al. |
| 8,655,371 B2 | 2/2014 | Huang |
| 8,660,576 B2 | 2/2014 | Huang |
| 8,694,025 B2 | 4/2014 | Dupray et al. |
| 8,779,917 B1 | 7/2014 | White |
| 8,897,803 B2 | 11/2014 | Pylappan et al. |
| 8,942,708 B2 | 1/2015 | Singh et al. |
| 9,042,254 B2 | 5/2015 | Soulie |
| 9,171,301 B1 | 10/2015 | Gupta et al. |
| 9,230,167 B2 | 1/2016 | Miller et al. |
| 9,319,836 B2 | 4/2016 | Jodlauk et al. |
| 9,336,679 B1 | 5/2016 | Chitale et al. |
| 9,585,036 B1 | 2/2017 | Tektumanidze et al. |
| 9,599,476 B2 | 3/2017 | Mund et al. |
| 9,661,066 B2 | 5/2017 | Seth et al. |
| 9,706,411 B2 | 7/2017 | Goswami et al. |
| 9,763,169 B2 | 9/2017 | Mcquaid |
| 10,102,536 B1 | 10/2018 | Hickman et al. |
| 10,229,434 B2 | 3/2019 | Cheng et al. |
| 10,264,504 B2 | 4/2019 | Zhang et al. |
| 10,296,525 B2 | 5/2019 | Brewington et al. |
| 10,356,707 B2 | 7/2019 | Liang et al. |
| 10,425,832 B1 | 9/2019 | Zawadzki et al. |
| 10,444,954 B2 | 10/2019 | Zhang et al. |
| 10,565,620 B1 | 2/2020 | Chadwick |
| 10,599,417 B2 | 3/2020 | Marche et al. |
| 10,601,684 B2 | 3/2020 | Hashmi et al. |
| 10,623,256 B2 | 4/2020 | Zawadzki et al. |
| 10,817,889 B2 | 10/2020 | Zachariah et al. |
| 10,931,764 B2 | 2/2021 | Davis et al. |
| 10,993,081 B2 | 4/2021 | Mehran et al. |
| 11,051,207 B2 | 6/2021 | Nieminen |
| 11,107,099 B2 | 8/2021 | Mayster et al. |
| 2002/0183075 A1 | 12/2002 | Fauconnier |
| 2004/0203867 A1 | 10/2004 | Schmidt |
| 2004/0205517 A1 | 10/2004 | Lampert et al. |
| 2006/0206610 A1 | 9/2006 | Ling et al. |
| 2010/0017261 A1 | 1/2010 | Evans et al. |
| 2013/0263042 A1* | 10/2013 | Buening ............ G06F 3/04883 715/783 |
| 2015/0019294 A1 | 1/2015 | Milton et al. |
| 2015/0100373 A1 | 4/2015 | Ignatyev et al. |
| 2015/0302123 A1 | 10/2015 | Gloss et al. |
| 2016/0019465 A1* | 1/2016 | Milton ................ H04W 4/029 706/52 |
| 2016/0055175 A1 | 2/2016 | Thompson et al. |
| 2017/0078412 A1 | 3/2017 | Wentz |
| 2017/0185685 A1 | 6/2017 | Brewer et al. |
| 2017/0192982 A1 | 7/2017 | Glover et al. |
| 2018/0165302 A1 | 6/2018 | Tanglertsampan et al. |
| 2021/0037351 A1* | 2/2021 | Hui ........................ H04W 4/90 |
| 2021/0350396 A1 | 11/2021 | Balise et al. |
| 2022/0027816 A1 | 1/2022 | Ritter et al. |
| 2022/0030382 A1* | 1/2022 | Klasson ................ G16H 40/20 |
| 2022/0163347 A1 | 5/2022 | Anastassov |
| 2024/0406836 A1* | 12/2024 | Tuli ...................... H04W 40/20 |

FOREIGN PATENT DOCUMENTS

| | | |
|---|---|---|
| CN | 105960816 A | 9/2016 |
| CN | 104217244 B | 5/2017 |
| CN | 110831019 B | 8/2020 |
| CN | 111750891 A | 10/2020 |
| CN | 112352256 A | 2/2021 |
| CN | 113574830 A | 10/2021 |
| CN | 113647055 A | 11/2021 |
| CN | 113779172 A | 12/2021 |
| CN | 113919433 A | 1/2022 |
| CN | 109348488 B | 2/2022 |
| CN | 112950119 B | 9/2022 |
| CN | 115379388 A | 11/2022 |
| CN | 115550251 B | 3/2023 |
| DE | 102016110430 A1 | 12/2017 |
| EP | 1199902 B1 | 3/2006 |
| EP | 1803315 A1 | 7/2007 |
| EP | 2172377 A1 | 4/2010 |
| EP | 2359643 A1 | 8/2011 |
| EP | 2386995 A1 | 11/2011 |
| EP | 3255924 A1 | 12/2017 |
| EP | 3721656 A1 | 10/2020 |
| EP | 3791350 A1 | 3/2021 |
| JP | 5690837 B2 | 2/2015 |
| JP | 5843960 B2 | 11/2015 |
| JP | 2019500674 A | 1/2019 |
| JP | 2020518886 A | 6/2020 |
| JP | 6987891 B2 | 12/2021 |
| KR | 100885775 B1 | 2/2009 |
| KR | 101631932 B1 | 6/2016 |
| WO | 0004734 A1 | 1/2000 |
| WO | 03102839 A1 | 12/2003 |
| WO | 2013088402 A1 | 6/2013 |
| WO | 2015047603 A1 | 4/2015 |
| WO | 2017127592 A1 | 7/2017 |
| WO | 2017193783 A1 | 11/2017 |
| WO | 2018026262 A2 | 2/2018 |
| WO | 2018185407 A1 | 10/2018 |
| WO | 2021239520 A1 | 12/2021 |

* cited by examiner

PROVIDING TELECOMMUNICATION NETWORK-RELATED RESOURCES TO GEOGRAPHIES BASED ON USER MOBILITY SYSTEMS AND METHODS

BACKGROUND

A wireless network, such as a cellular network, can include an access node (e.g., base station) servicing multiple wireless devices or user equipment (UE) in a geographical area covered by a radio frequency transmission provided by the access node. As technology has evolved, different carriers within the cellular network have utilized different types of radio access technologies (RATs). RATs can include, for example, 3G RATs (e.g., GSM, CDMA, etc.), 4G RATs (e.g., WiMax, Log Term Evolution (LTE, etc.), 5G RATs (New Radio (NR)). To ensure consistent coverage through a wide geographic range, existing technologies such as 4G are often used in combination with newer technologies such as 5GNR. However, while newer technologies may be increasingly deployed in urban and suburban areas, small town and rural areas may continue to be supported primarily through older technologies such as 4G LTE due to their decreased population with respect to urban and suburban areas. Accordingly, small town and rural areas may inadvertently suffer from a lack of coverage as newer technologies are deployed to other, more populated geographic areas.

While older technologies may continue to support small town and rural areas, this alone does not ensure adequate and consistent coverage as new technologies are vastly superior to the older technologies. Without users moving to small town and rural areas, justifying the deployment of network resources is often troublesome. Accordingly, there is a need to evaluate small town and rural areas to ensure that such areas are able to receive network resources to provide adequate and consistent cellular network coverage.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

To ensure adequate and consistent network coverage in underserved geographies and populations, such as small towns and rural geographic areas, deploying enhanced network resources (e.g., network antennas, wireless sites, etc.) can ensure users within such areas experience better network connectivity. While existing systems that provide additional network resources to these geographies may enable a better user experience, resources for deploying network resources are limited, constrained by material shortages, property availability, and other factors. For example, small town and rural areas have low population densities and span large geographic areas. To ensure adequate network coverage in small towns and rural areas, a large amount of network resources need to be deployed to such geographic areas. However, due to the limited availability of network resources, existing systems that relocate network resources from well served geographies to underserved geographies cause a decreased user experience in the well served geographies. Moreover, due to the range limitations of wireless sites, these sites must be positioned within proximity of one another to ensure adequate coverage. As underserved geographic areas are large, the amount of available sites to be deployed to such locations may be limited, further amplifying adequate network coverage issues.

Another common problem faced by existing systems is their lack of a mechanism to account for user mobility from one geographic area to another. For example, as users in underserved geographies typically travel from one location to another (e.g., their home residence to a work place), sporadic placement of network resources may be wasteful. For instance, providing additional network resources often involve large energy requirements (e.g., for powering cell sites) and can be harmful to the environment (e.g., due to the construction of such network resources). Without a mechanism to account for trends in which users of underserved geographic areas may benefit the most from additional network resources, the sporadic placement of network resources may further propel issues associated with determining which geographic areas should obtain additional network resources.

In light of these and other problems with existing solutions and systems, there is a need for accurately determining whether to deploy enhanced network resources to a given geographic area. Furthermore, there is a need to determine which users (e.g., within a geographic area) may benefit the most from enhanced network resources.

The inventors have developed a system for providing telecommunication network-related resources to geographies based on user mobility. For instance, the inventors have developed a network resource deployment system that splits geographic areas into a set of geographically-distinct sub-areas to adequately deploy network resources that ensures adequate network coverage and connectivity based on user mobility. For example, the system obtains user mobility data indicating movement of user locations from geographically-distinct sub-areas of a proposed split-area (e.g., an underserved geographic area). Using the user mobility data, the system then determines a user-mobility metric for each geographically-distinct sub-areas that indicates users' mobility from the respective sub-area to another geographic location that (i) is network-ready and (ii) within a threshold distance of the respective sub-area to identify which users may benefit the most from additional network resources. For example, users within a sub-area that travel to another location that is network-ready indicates that adequate network coverage is important to their day-to-day tasks. For instance, users commuting for work, leisurely activities (e.g., shopping center, sports arena, library, etc.), or school may benefit from additional network resources due to reliance on network connectivity to enhance the user experience that occurs at such locations prior to the user's arrival (e.g., creating a shopping list, performing research, checking traffic conditions, etc.). The system then identifies a subset of the geographically-distinct sub-areas that satisfy a network-ready condition to identify geographic areas that require minimal additional resources that (i) enhances network coverage and connectivity and/or (ii) reduces wasted energy and environmental impact to such areas. When the user-mobility metrics of the subset of geographically-distinct sub-areas satisfy a user mobility threshold value (e.g., a percentage, ratio, decimal, integer, or other value), the system may permanently split the proposed-split area into the set of geographically-distinct sub-areas and deploy additional network resources to the subset of geographically-distinct sub areas. By doing so, the system not only provides users with enhanced network connectivity, but also mitigates environmental impact and energy wastefulness.

In various implementations, the methods and systems described herein provide telecommunication network-related resources to geographies based on user mobility. For example, the system can identify from a set of geographically-distinct areas, a proposed-split area, where the proposed-split area fails to satisfy a network-ready condition. The system can temporarily split the proposed-split area into a set of geographically-distinct sub-areas using a geographical constraining condition. The system can obtain, from a third-party resource, user mobility data indicating movement of user locations from a respective geographically-distinct sub-area of the set of geographically-distinct sub-areas to a geographic location, where the geographic location (i) satisfies the network-ready condition and (ii) is within a threshold distance of the respective geographically-distinct sub-area. The system can determine a user-mobility metric for each geographically-distinct sub-area of the set of geographically-distinct sub-areas using the user-mobility data for the respective geographically-distinct sub-area. The system can identify a subset of geographically-distinct sub-areas of the geographically-distinct sub-areas that satisfy the network-ready condition. The system can, in response to the user-mobility metrics of the subset of geographically-distinct sub-areas satisfying a user mobility threshold value, (i) permanently split the proposed-split area into the set of geographically-distinct sub-areas and (ii) deploy one or more network resources to the subset of geographically-distinct sub-areas.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

Figure 1:
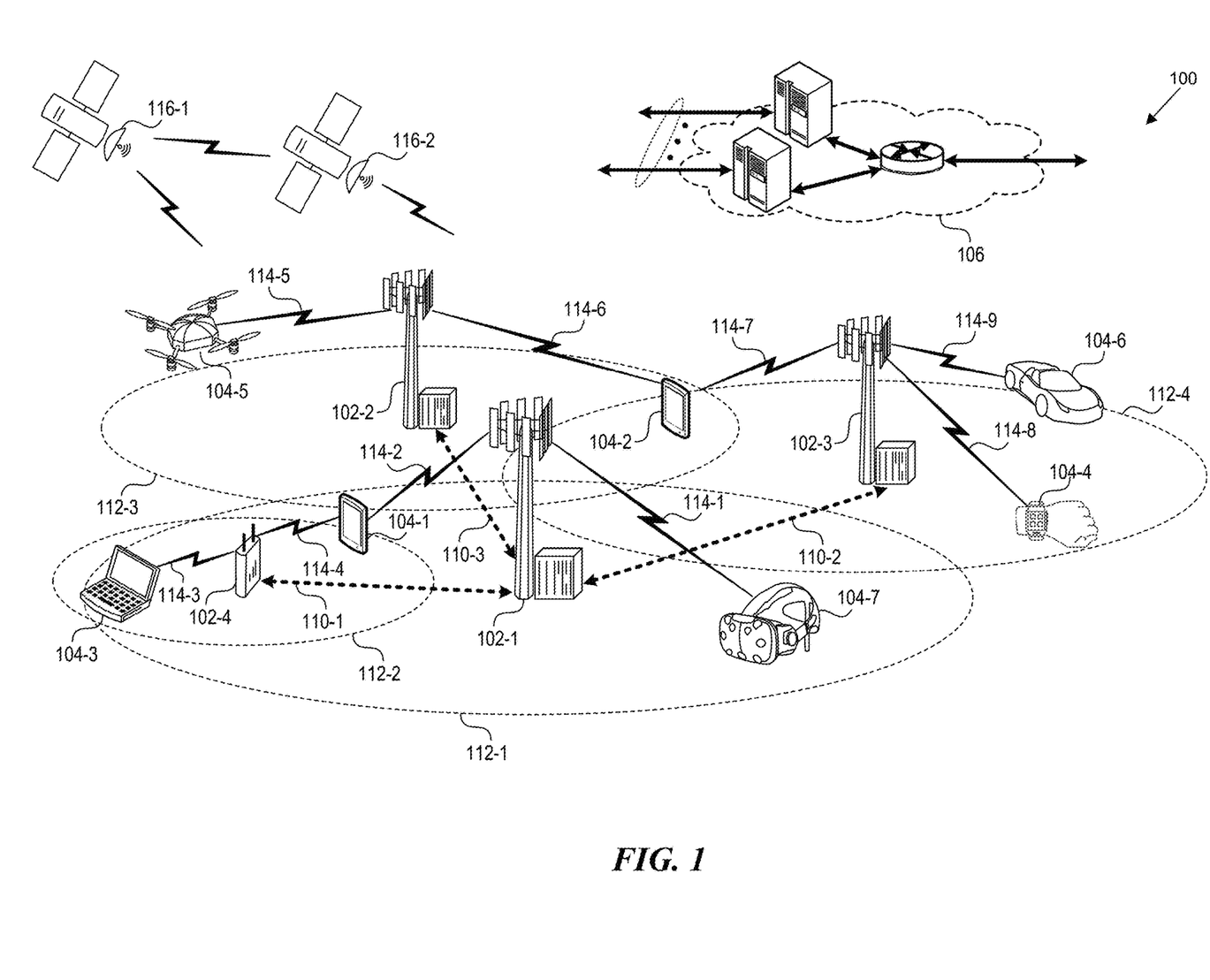
FIG. 1 is a block diagram that illustrates a wireless communications system that can implement aspects of the present technology.

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
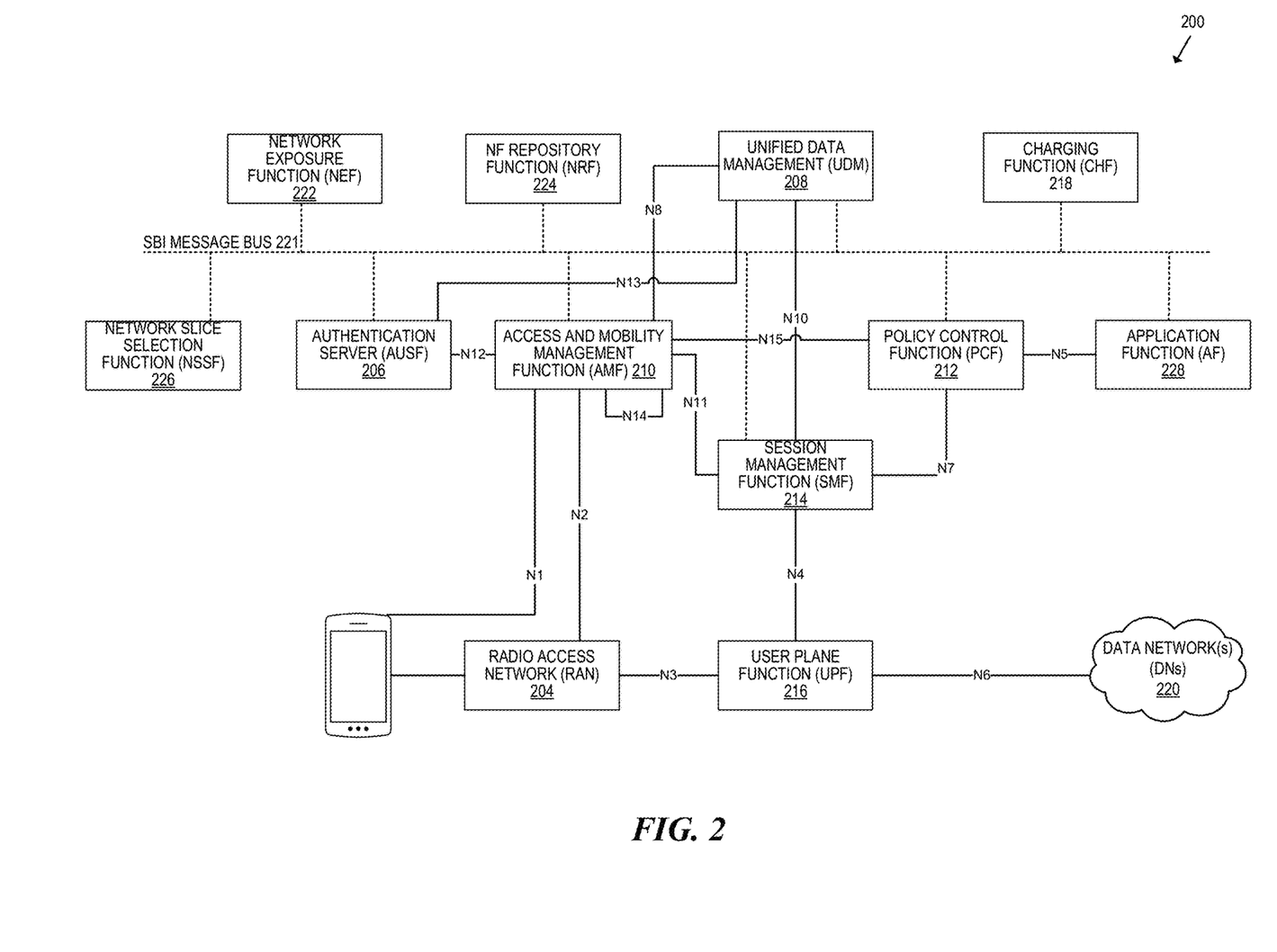
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Figure 3:
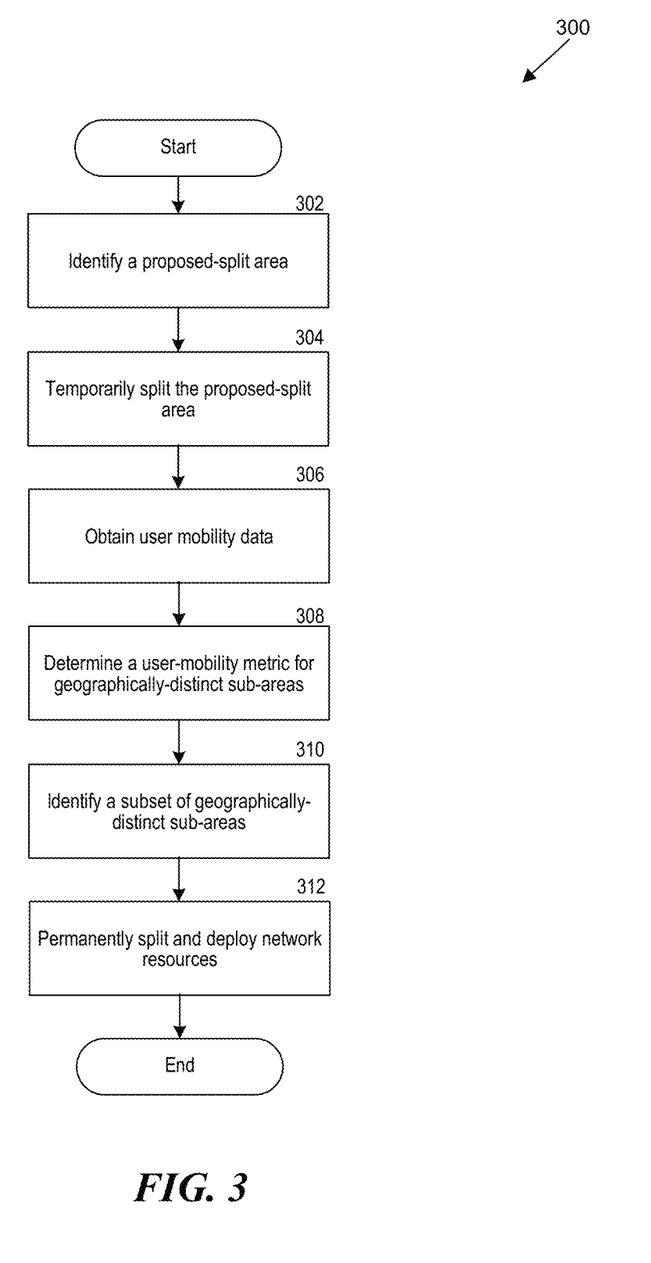
FIG. 3 is a flow chart illustrating a process for providing telecommunication network-related resources to geographies based on user mobility, in accordance with one or more implementations of the present technology.

Providing Telecommunication Network-Related Resources to Geographies Based on User Mobility FIG. 3 is a flow chart illustrating a process 300 for providing telecommunication network-related resources to geographies based on user mobility, in accordance with one or more implementations of the present technology.

At act 302, process 300 can identify a proposed-split area. For example, to provide or deploy network resources to geographic areas, process 300 can identify from a set of geographically-distinct areas, a proposed-split area, where the proposed-split area fails to satisfy a network-ready condition. As used herein, the network-ready condition indicates whether a geographic region is network ready, which may be based on a network readiness score, churn data, coverage data, correlation between churn data and coverage metrics, or other data or conditions. Examples of network-ready condition are provided in, for example, U.S. Pat. No. 11,523,289, the contents of which are incorporated herein in their entirety.

The geographically-distinct areas may be geographic regions that are separate from one another. For instance, geographically-distinct areas may be distinct from one another based on country boundaries, state boundaries, city boundaries, county boundaries, zip code boundaries, census block group boundaries, or other geographically-related boundaries. In some implementations, the geographically-distinct areas are combined to form an updated geographically-distinct area. For example, two counties may be combined together to form a geographically-distinct area with respect to other counties, states, zip codes, or other geographic areas. That is, a geographically-distinct area may be a geographical region that is separate from one or more other geographical regions.

Figure 4:
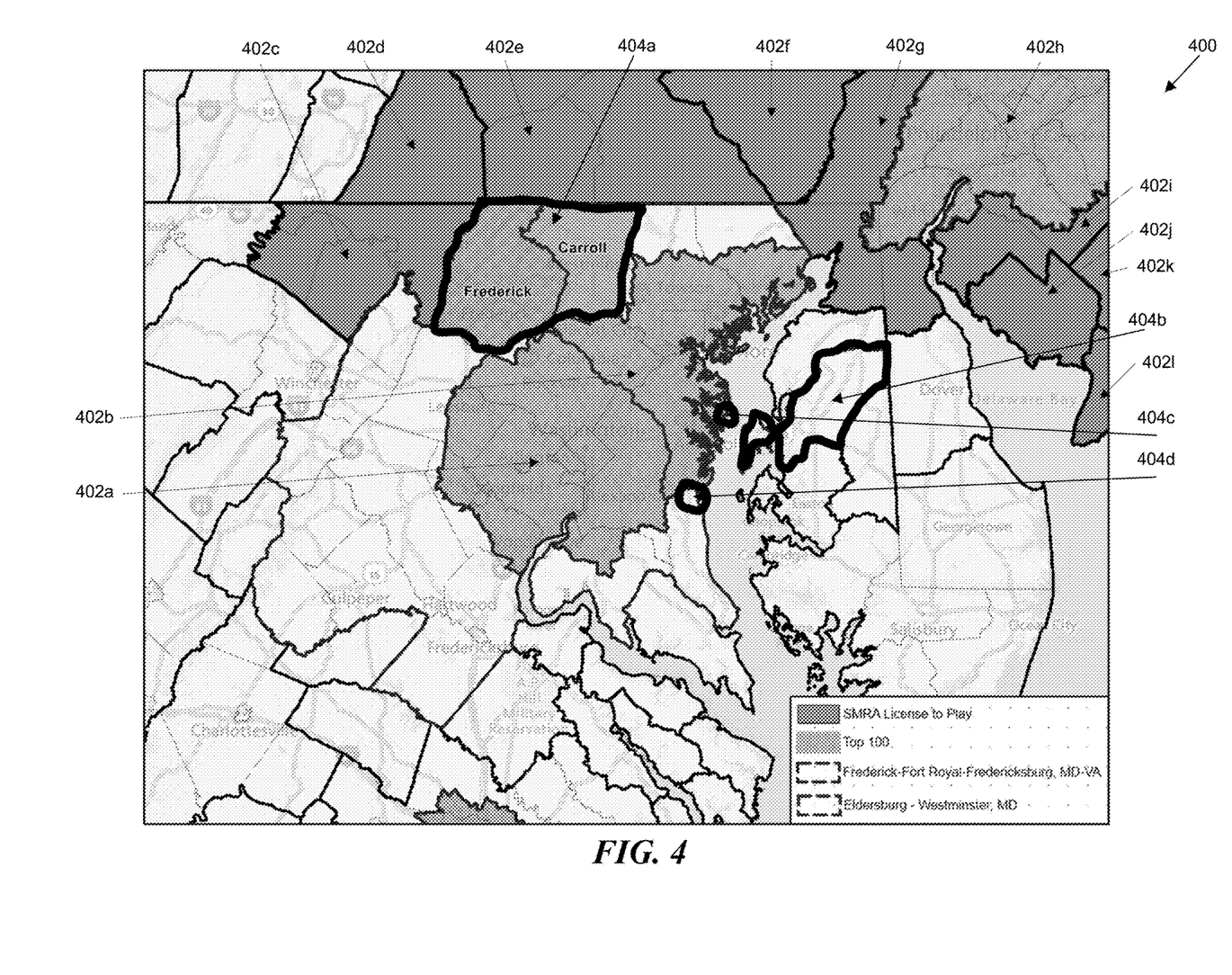
FIG. 4 illustrates a proposed split-area, in accordance with one or more implementations of the present technology.

Referring to FIG. 4 showing a set of geographically-distinct areas 400, process 300 can identify a proposed-split area 404a-404d from a set of geographically-distinct areas 402a-402l. For example, the proposed-split area 404a-404d, prior to identifying such proposed-split area 404a-404d is part of geographically-distinct areas 402a-402l. As such, process 300 may identify, from the set of geographically-distinct areas, proposed-split area 404a-404d, where proposed-split area 404a-404d fails to satisfy the network-ready condition. In such example, proposed-split area 404a-404d is made up of two counties (e.g., Frederick and Carroll county Maryland). Proposed-split area 404a-404d is not only geographically-distinct from the set of geographically-distinct areas 402a-402l (e.g., based on county boundaries), but also fails to satisfy the network-ready condition (e.g., the proposed-split area is not cellular-ready, the proposed-split area has no or little cellular-network coverage, the proposed-split area includes a underserved population with respect to adequate and consistent cellular-network coverage, the proposed-split area is not satellite communications ready, the proposed split-area has no or little satellite communication coverage, etc.).

As the proposed-split area 404a-404d fails to satisfy the network-ready condition, it is advantageous to split the proposed-split area into a set of geographically-distinct sub-areas to determine whether network resources should be deployed to all, or a portion of, the set of geographically-distinct sub-areas. For example, although the proposed-split area 404a-404d (e.g., as a whole) currently fails to satisfy the network-ready condition, portions of the proposed split area 404a-404d may satisfy the network-ready condition when the proposed split area 404a-404d is split into a set of geographically-distinct sub-areas. As opposed to existing systems that merely deploy a large amount of network resources to a geographic area that is not network-ready, the system accurately determines which geographic areas within a non-network ready area may be network-ready, therefore efficiently providing or deploying network resources to such geographic areas. By doing so, the system may reduce the amount of energy used by network resources (e.g., cell/satellite sites, cell/satellite towers, cellular/satellite service provider locations) and reduce the environmental impact of deploying such network resources (e.g., due to the construction of such network resources).

Referring back to FIG. 3, at act 304, process 300 can temporarily split the proposed-split area into a set of geographically-distinct sub-areas using a geographical constraining condition. The geographical constraining condition can indicate boundaries, such as country boundaries, state boundaries, city boundaries, county boundaries, zip code boundaries, census block group boundaries, or other geographically-related boundaries. Additionally or alternatively, the geographical constraining condition can be a desired area, such as an amount of square feet, square miles, square kilometers, or the like. The geographical constraining condition can be a predetermined constraining condition or a user selectable geographical constraining condition. For example, a user, such as a telecommunication administrator, or other telecommunications employee, may interact with a user interface from a mobile device to select a geographical constraining condition to optimize the deployment of network resources.

In some implementations, the geographical constraining condition can be dynamic. For instance, the system may determine the size of the proposed-split area and may select a geographical constraining condition that is smaller than (e.g., less than) the size of the proposed-split area. In some implementations, the geographical constraining condition can be based on the proposed-split area's boundaries. For instance, where the proposed-split area is a geographic area defined by a county boundary (or boundaries), the system may select a geographical constraining condition that is smaller than an area covered by the boundary of the proposed-split area (e.g., a zip code boundary, a census block boundary, etc.). That is, process 300 determines the size of the proposed split area (e.g., based on boundaries, based on the size of the geographic area in square feet, square miles, etc.) and determines the geographical constraining condition (e.g., such that the geographical constraining condition is smaller in size of the proposed split area) to temporarily split the proposed-split area into geographically-distinct sub-areas.

Figure 5:
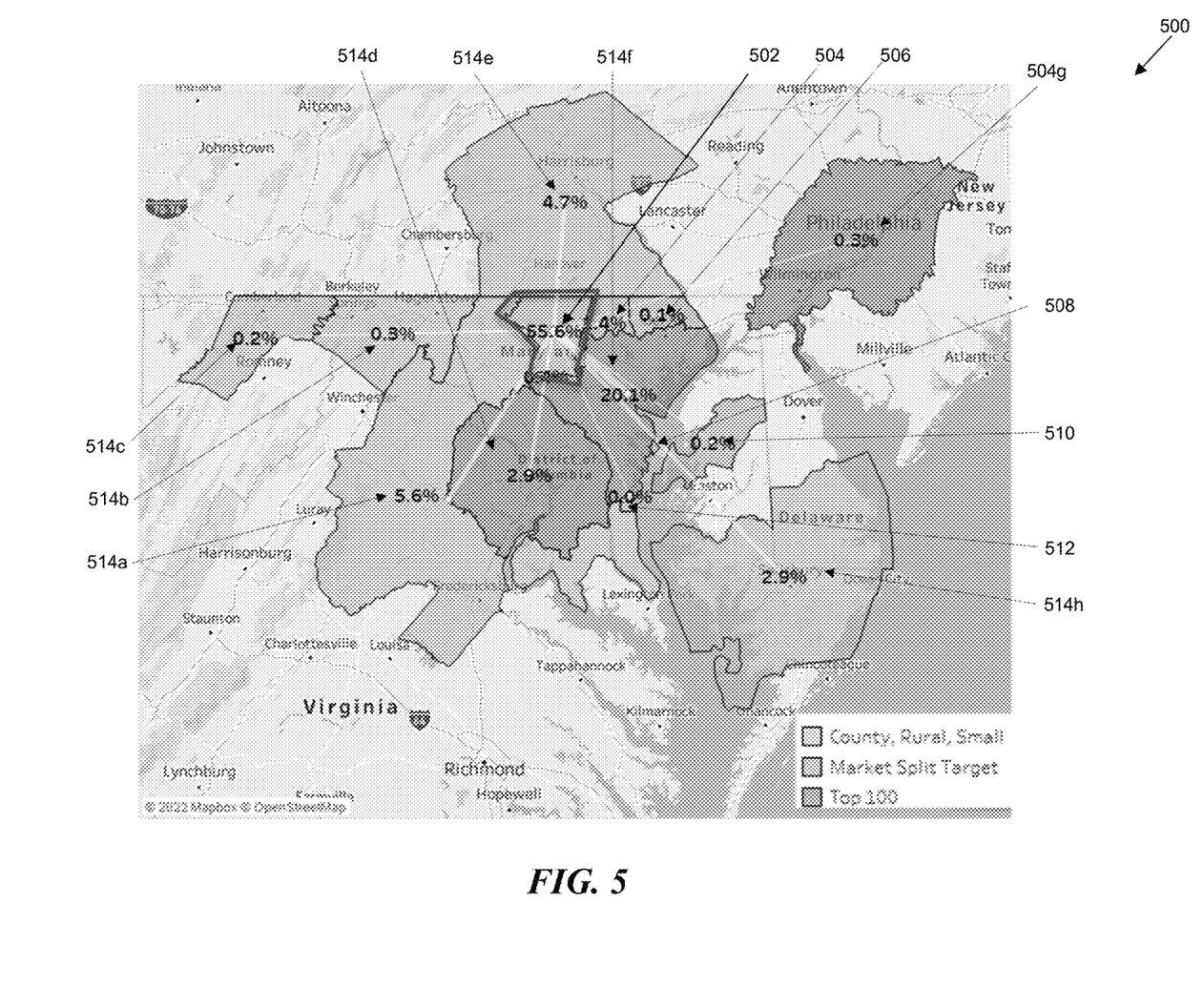
FIG. 5 illustrates a set of geographically-distinct sub-areas, in accordance with one or more implementations of the present technology.

Referring to FIG. 5, showing a set of geographically distinct areas 500, proposed split area 404a-404d (FIG. 4) is temporarily split into a set of geographically-distinct sub-areas 502-512. For example, referring back to FIG. 4, proposed-split area 404a-404d indicate Frederick and Carrol County, Maryland. As discussed above, such counties fail to satisfy the network-ready condition. In order to determine whether the underserved, non-network-ready geographic location (e.g., the proposed-split area) may include sub-geographies that are network-ready and may efficiently use additional network resources, process 300 temporarily splits the proposed-split area into the set of geographically-distinct sub-areas 502-512 (FIG. 5). As shown in this example, the geographically-distinct sub-areas 502-512 are bounded by a geographical constraining condition that is smaller than the area of the proposed-split area 404a-404d. For example, the proposed-split area in FIG. 4 encompassed Frederick and Carrol County, however, upon the splitting, Frederick and Carrol County is now temporarily split into first geographically-distinct sub-area 502, second geographically-distinct sub-area 504, third geographically-distinct sub-area 506, fourth geographically-distinct sub-area 508, fifth geographically-distinct sub-area 510, and sixth geographically-distinct sub-area 512. It should be noted, that although such example temporarily splits the proposed-split area into six geographically-distinct sub-areas, that more or less may exist based on the size of the proposed-split area and the geographical constraining condition.

In some implementations, process 300 can perform a second split. For example, when an initial temporary split of the proposed-split area results in a large amount of geographically-distinct sub-areas satisfying the network-ready condition, process 300 may further split the geographic areas to obtain more information as to which geographic areas (e.g., small towns and rural areas) of the split may benefit the most from additional network resources. As such, process 300 determines a number of the set of geographically-distinct sub-areas that satisfy the network-ready condition. For example, process 300 may count the number of geographically-distinct sub-areas (e.g., within the proposed-split area) that satisfy the network-ready condition. In response to the number satisfying a network-ready condition threshold number, process 300 may perform a second split of each geographically-distinct sub area of the set of geographically-distinct sub-areas using a second geographical constraining condition. The number may satisfy the network-ready condition threshold number by meeting or exceeding the network-ready condition threshold number (e.g., an integer, decimal, ratio, percentage, or other number).

When the number satisfies the network-ready condition threshold number, process 300 may perform the second split to generate a second set of geographically-distinct sub-areas. For instance, the second split may split the set of geographically-distinct sub-areas into a second set of geographically-distinct sub-areas using a second geographical constraining condition. Similar to the above, the second geographical constraining condition may be can indicate boundaries, such as country boundaries, state boundaries, city boundaries, county boundaries, zip code boundaries, census block group boundaries, or other geographically-related boundaries. Additionally or alternatively, the second geographical constraining condition can be a desired area, such as an amount of square feet, square miles, square kilometers, or the like. The second geographical constraining condition can be a predetermined constraining condition or a user selectable geographical constraining condition. For example, a user may interact with a user interface from a mobile device to select a second geographical constraining condition. Additionally, in some implementations, the second geographical constraining condition may be a geographical constraining condition that is smaller (e.g., in area or boundary-wise) to further split the set of geographically-distinct sub-areas into a second set of geographically-distinct sub-areas. Process 300 then updates the set of geographically-distinct sub-areas to the second set of geographically-distinct sub-areas for further processing. By doing so, the system increases the amount of geographically-distinct sub-areas to accurately determine which geographic areas may benefit the most from additional/enhanced network resources, thereby reducing the amount of energy used at sporadically placed network resources and reducing the environmental impact caused by sporadically placing network resources.

At act 306, process 300 can obtain user mobility data. For example, process 300 can obtain, from a third-party resource, user mobility data indicating movement of user locations from a respective geographically-distinct sub-area of the set of geographically-distinct sub-areas to a geographic location. As used herein, "user" (or collectively "users") may refer to users of network carriers (e.g., all known cellular-network carriers, satellite communication carriers), a given cellular/satellite network carrier, or other person that is associated with cellular/satellite networks. The third-party resource can be a crowdsourced data resource such as Ookla, SafeGraph, or other crowdsourced data resource. Additionally or alternatively, the third-party resource can be the Internet, where information is web scraped pertaining to users moving from one location to another. As an example, the third-party resource may store or host data that indicates user's movements from one location to another location with respect to network carriers. For example, as cellular-network carriers and crowdsourced data services store anonymous information pertaining to (i) users cellular-network carrier(s) and (ii) locations that the users move from, process 300 obtains such information to determine user mobility data. The user mobility data indicates the movement of user locations from a respective geographically-distinct sub-area of the set of geographically-distinct sub area to another geographic location. For example, the other geographic location is one that (i) satisfies the network-ready condition and (ii) is within a threshold distance of a respective geographically-distinct sub-area.

For context, the system obtains such user mobility data to determine which users in which geographies are moving from one geographic area (e.g., of the geographically-distinct sub areas) to another geographic area that is network ready and within a threshold distance of the respective geographically-distinct sub-area. Such user mobility data provides insight as to which geographically-distinct sub-area seeks better network coverage. As such geographically-distinct sub-areas are part of an underserved geographical area (e.g., the proposed-split area) with respect to adequate network coverage, by obtaining data indicative of user movements from such geographically-distinct sub-areas to other geographic areas that are network-ready, the system may determine which geographically-distinct sub-areas of the proposed-split area seek adequate, consistent, and better network coverage and connectivity. Therefore, as opposed to existing systems that may simply waste deploying a vast amount of network resources to the proposed-split area, the system may leverage unique data to determine which geographically-distinct sub-areas of the proposed-split area to deploy network resources to. Furthermore, by ensuring that the geographic location which users move (e.g., travel to) from a respective geographically-distinct sub-area is within a threshold distance of the respective geographically-distinct sub-area, the system may reduce the amount of computer processing and memory resources by considering only those locations that are within/at the threshold distance. For instance, the system may reduce the amount of outliers to obtain more accurate user mobility data, and only process those locations for determining user-mobility metrics. For example, the threshold distance may be a predetermined distance such as 1, 2, 3, . . . , 80, 100, . . . , 1000, mile(s)/kilometer(s)/feet/centimeter(s)/other metric. In some implementations, the threshold distance may be dynamically determined.

In some implementations, process 300 can update the threshold distance. For example, process 300 can determine a number of the set of geographically-distinct sub-areas that satisfy the network-ready condition. In response to the number satisfying a network-ready condition threshold number, process 300 updates the threshold distance to a second threshold distance that is less than that of the threshold distance. For example, process 300 may determine a number (or amount) of geographically-distinct sub-areas of the set of geographically-distinct sub-areas (e.g., of the proposed split area) that are network ready. For example, when the number meets or exceeds a network-ready condition threshold number, process 300 may update the threshold distance to a smaller distance to obtain more accurate data representing which users traveling from such geographically-distinct sub-areas would benefit the most from additionally deployed network resources. As discussed above, the network-ready condition threshold number may be a predetermined number (e.g., integer, decimal, ratio, percentage, etc.).

As opposed to existing systems that have no mechanism to account for user-mobility when determining whether to deploy additional resources, it may be advantageous to update (or alternatively, change) the threshold distance. For example, to ensure that the most accurate data is obtained for use in determining whether to deploy network resources to geographic areas that may be underserved with respect to network connectivity and coverage, reducing such threshold distance may provide insight as to which geographic areas (e.g., of the proposed-split area) would be the best candidates for such network resources. By reducing the threshold distance (e.g., with respect to other network-ready areas that users travel to from a respective geographically-distinct sub-area) process 300 synthesizes a reduction in network-ready geographic areas (e.g., of the proposed-split area) to enable process 300 to more accurately identify which geographically-distinct sub-areas benefit the most from a deployment of additional network resources. Conversely, by increasing the threshold distance, process 300 synthesizes an amplification in network-ready geographic areas to enable process 300 to more accurately identify which geographically-distinct sub-areas benefit the most from a deployment of additional network resources.

As such, in some implementations, process 300 can update the threshold distance to a third threshold distance that is less than that of the threshold distance (originally). For example, process 300 can determine a number of the set of geographically-distinct sub-areas that fail to satisfy the network-ready condition. In response to the number failing to satisfy a network-ready condition threshold value, process 300 updates the threshold distance to a second threshold distance that is greater than that of the threshold distance. In this way, when the number of geographically-distinct sub-areas are low, the system can amplify which geographically-distinct sub-areas may be network-ready, thus, enabling the system to more accurately identify which geographically-distinct sub-areas benefit the most from a deployment of additional network resources.

In some implementations, process 300 can determine the threshold distance using a population density. For example, process 300 can determine a population density of users in the proposed-split area. The population density may be obtained by accessing a database, by performing web-scraping, or being manually inputted by a user (e.g., via a user interface). The population density of the proposed-split area may shed light onto how far the system considers users mobility from a geographically-distinct sub-area to another geographic location that is network-ready. For instance, where a population-density is high, the threshold distance to which the system considers user mobility may be low. That is, as more users are concentrated in a particular geographic area, such information may indicate the user's live in a city (or other highly concentrated geographic region). The threshold distance may be lower for a more concentrated geographic area to deduce more accurate user-mobility data concerning where users travel to. This is particularly advantageous when determining whether underserved geographies (e.g., with respect to network coverage and connectivity) would be better served with additional network resources as highly concentrated geographic areas often include users that do not travel far (e.g., for a place of work, leisurely activities, etc.).

Conversely, where a population-density is low, the threshold distance to which the system considers user mobility for may be large. That is, as less users are concentrated in a particular geographic area, such information may indicate the user's live in a small town or rural area. The threshold distance may be higher for a less concentrated geographic area to deduce more accurate user-mobility data concerning where users travel to. This is particularly advantageous when determining whether underserved geographies (e.g., with respect to network coverage and connectivity) would be better served with additional network resources as less concentrated geographic areas often include users that travel far (e.g., for a place of work, leisurely activities, etc.). As such, a database may store population-density values of geographic areas (e.g., proposed-split areas) that correspond to a predetermined threshold distance value (e.g., mapping population densities to threshold distance values). Process 300 may use the population-density of users in the proposed-split area to determine the threshold distance value (e.g., via a matching, being within a range of a population density, etc.) for obtaining the user mobility data.

At act 308 process 300 can determine a user-mobility metric for geographically-distinct sub-areas. For example, process 300 can determine a user-mobility metric for each geographically-distinct sub-area of the set of geographically-distinct sub-areas using the user-mobility data for the respective geographically-distinct sub-area. In some implementations, the user-mobility metric can be a percentage of users that move (e.g., travel, commute, etc.) from a geographically-distinct sub-area to another geographic area that is network-ready (e.g., satisfies the network-ready condition). For instance, the system may use the user-mobility data to determine how many users of a given geographically-distinct sub-area travel to other geographic areas that are network-ready with respect to all users of the given geographically-distinct sub-area. As discussed above, the user-mobility data considers movement of user locations from geographically-distinct sub-areas to other geographic locations that (i) satisfy the network-ready condition and (ii) is within the threshold distance of the respective geographically-distinct sub-area. Thus, process 300 may determine, for each geographically-distinct sub-area of the set of geographically0distinct sub-areas, a percentage of users that travel from a respective geographically-distinct sub-area to another geographic location that satisfies the network-ready condition and is within the threshold distance of the respective geographically-distinct sub area.

Referring to FIG. 5, process 300 may determine a user-mobility metric for each geographically-distinct sub-area of the set of geographically-distinct sub-areas using the user-mobility data for the respective geographically-distinct sub-area. As an example, to determine a user-mobility metric for the first geographically-distinct sub-area 502, process 300 may compute a percentage of how many users travel from first geographically-distinct sub-area 502 to each other geographic location that (i) satisfies the network ready condition and (ii) is within the threshold distance of the respective geographically-distinct sub-area. For instance, process 300 determines that 55.6% of users move within the first geographically-distinct sub-area 502, 1.4% of users move from first geographically-distinct sub-area 502 to second geographically-distinct sub-area 504, 0.1% of users move from first geographically-distinct sub-area 502 to third geographically-distinct sub-area 506, 0% of users move from first geographically-distinct sub-area 502 to fourth geographically-distinct sub-area 508, 0.2% of users move from first geographically-distinct sub-area 502 to fifth geographically-distinct sub-area 510, and 0% of users move from first geographically-distinct sub-area 502 to sixth geographically-distinct sub-area 512. Additionally, process 300 determines that 5.6% of users move from first geographically-distinct sub-area 502 to first geographic area 514*a*, 0.3% of users move from first geographically-distinct sub-area 502 to second geographic area 514*b*, 0.2% of users move from first geographically-distinct sub-area 502 to third geographic area 514*c*, 2.9% of users move from first geographically-distinct sub-area 502 to fourth geographic area 514*d*, 4.7% of users move from first geographically-distinct sub-area 502 to fifth geographic area 514*e*, 20.1% of users move from first geographically-distinct sub-area 502 to sixth geographic area 514*f*, 0.3% of users move from first geographically-distinct sub-area 502 to seventh geographic area 514*g*, and 2.9% of users move from first geographically-distinct sub-area 502 to eighth geographic area 514*h*. Thus, the user-mobility metric for the first geographically-distinct sub-area is 94.3%.

At act 310, process 300 can identify a subset of geographically-distinct sub-areas. For example, process 300 can identify a subset of geographically-distinct sub-areas of the geographically-distinct sub-areas that satisfy the network-ready condition. It is advantageous to determine a subset of the geographically-distinct sub-areas that satisfy the network-ready condition as not all geographically-distinct sub-areas may be network-ready. For instance, to efficiently deploy network resources to underserved geographic areas that enhance the user experience (e.g., by providing more consistent and adequate cellular-network connectivity, coverage, and support), the system deploys such network resources to geographic areas that are network-ready to reduce the amount of additional network resources, thereby further reducing energy consumption and environmental impact of deploying additional network resources. Process 300 may determine, for each geographically-distinct sub-area of the set of geographically-distinct sub-areas, whether the respective geographically-distinct sub-area satisfies the network-ready condition. When the respective geographically-distinct sub-area satisfies the network-ready condition, process 300 may add the geographically-distinct sub-area to the subset of geographically-distinct sub-areas that satisfy the network-ready condition.

At act 312, process 300 can permanently split and deploy network resources. For example, process 300, can, in response to the user-mobility metrics of at least one of the subset of geographically-distinct sub-areas satisfying a user mobility threshold value, (i) permanently split the proposed-split area into the set of geographically-distinct sub-areas and (ii) deploy one or more network resources to the subset of geographically-distinct sub-areas. The user mobility threshold value can be a predetermined threshold value such as a predetermined integer, percentage, ratio, decimal, or other value. As an example, where the user-mobility threshold value is a predetermined percentage value, the user-mobility threshold value may be set to 80%. In some implementations, the user mobility threshold value can be a dynamic value based on the threshold distance. For example, the user mobility threshold value may correspond to the threshold distance (e.g., as discussed in act 306), where the user mobility threshold value is increased based on the threshold distance being increased (e.g., from the original threshold distance value) and may be decreased based on the threshold distance being decreased (e.g., from the original threshold distance value). The user mobility threshold value may be satisfied when a user-mobility metric meets or exceeds the user mobility threshold value.

Process 300 can determine, for each user-mobility metric of the subset of geographically-distinct sub-areas, whether the respective user-mobility metrics satisfy the user mobility threshold value. For instance, referring back to FIG. 5 and continuing with the example above, where the first geographically-distinct sub-area has a user-mobility metric of 94.3% and the user mobility threshold value is 80%, then process 300 (i) permanently splits the proposed-split area into the set of geographically-distinct sub-areas and (ii) deploys one or more network resources to the subset of geographically-distinct sub-areas (e.g., that satisfy the network-ready condition and satisfies the user mobility threshold value). The one or more network resources can be a telecommunication network antenna (e.g., a cellular-network antenna, a satellite for satellite communications), telecommunication network service location (e.g., a cellular-carrier store, a cellular-carrier support center, a cellular-carrier repair store, satellite communications store, satellite-carrier support center, etc.), a telecommunication network site (e.g., a cell site, a satellite site), or other telecommunication network resource. In this way, the system provides enhanced network resources to underserved geographic areas that benefit the most from such network resources. Additionally, by providing such network resources to the subset of geographically-distinct areas that satisfy the network-ready condition and satisfies the user-mobility threshold value, the system reduces the amount of energy consumption and the environmental impact associated with providing such network resources.

Computer System

Figure 6:
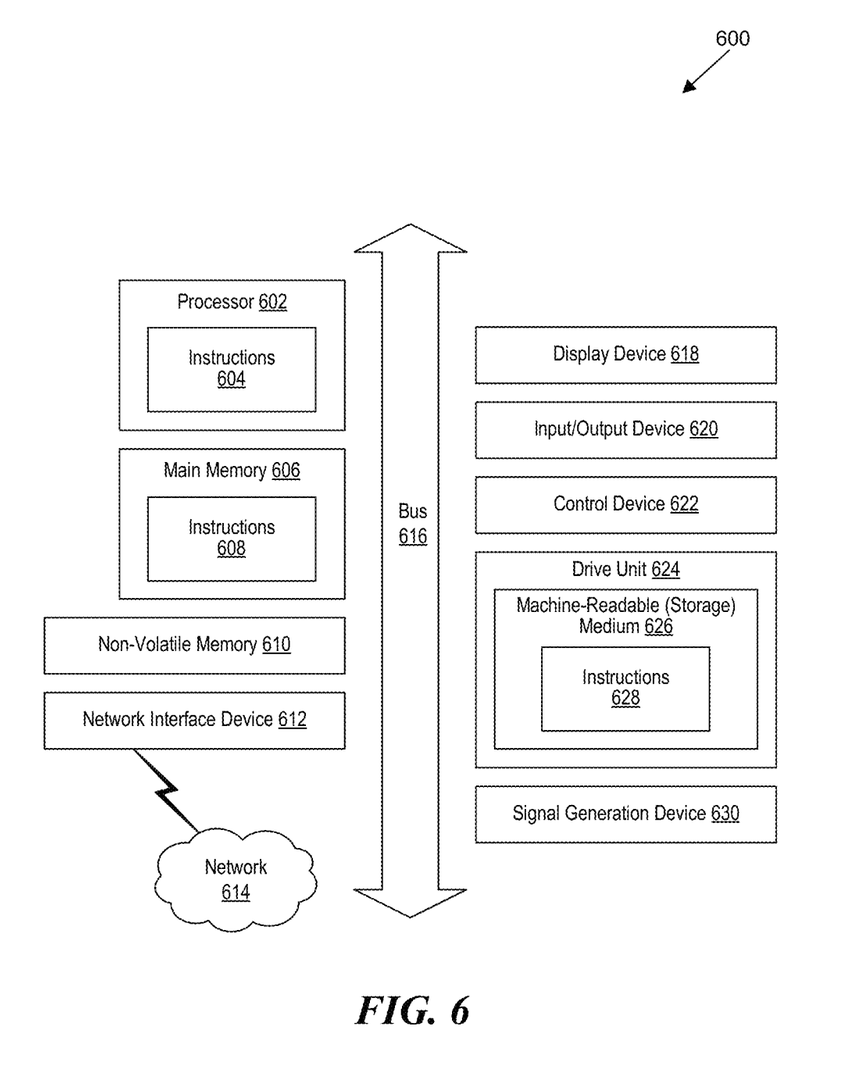
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A method, the method comprising:
   identifying from a set of geographically-distinct areas, a proposed-split area, wherein the proposed-split area fails to satisfy a network-ready condition;
   temporarily splitting the proposed-split area into a set of geographically-distinct sub-areas using a geographical constraining condition;
   obtaining, from a third-party resource, user mobility data indicating movement of user locations from a respective geographically-distinct sub-area of the set of geographically-distinct sub-areas to a geographic location, wherein the geographic location (i) satisfies the network-ready condition and (ii) is within a threshold distance of the respective geographically-distinct sub-area;
   determining a user-mobility metric for each geographically-distinct sub-area of the set of geographically-distinct sub-areas using the user-mobility data for the respective geographically-distinct sub-area;
   identifying a subset of geographically-distinct sub-areas of the geographically-distinct sub-areas that satisfy the network-ready condition; and
   in response to the user-mobility metrics of at least one of the subset of geographically-distinct sub-areas satisfying a user mobility threshold value, (i) permanently splitting the proposed-split area into the set of geographically-distinct sub-areas and (ii) deploying one or more network resources to the subset of geographically-distinct sub-areas.

2. The method of claim 1, further comprising:
   determining a number of the set of geographically-distinct sub-areas that satisfy the network-ready condition;
   in response to the number satisfying a network-ready condition threshold number, performing a second split of each geographically-distinct sub-area of the set of geographically-distinct sub-areas using a second geographical constraining condition to generate a second set of geographically-distinct sub-areas; and
   updating the set of geographically-distinct sub-areas to the second set of geographically-distinct sub-areas.

3. The method of claim 1, further comprising:
   determining a number of the set of geographically-distinct sub-areas that satisfy the network-ready condition; and
   in response to the number satisfying a network-ready condition threshold number, updating the threshold distance to a second threshold distance that is less than that of the threshold distance.

4. The method of claim 1, further comprising:
   determining a number of the set of geographically-distinct sub-areas that fail to satisfy the network-ready condition; and
   in response to the number failing to satisfy a network-ready condition threshold value, updating the threshold distance to a second threshold distance that is greater than that of the threshold distance.

5. The method of claim 1, further comprising:
   determining a population density of users in the proposed-split area; and
   accessing a database to determine the threshold distance using the population density of the users in the proposed-split areas, wherein the database comprises information mapping population densities to threshold distance values.

6. The method of claim 1, wherein the geographical constraining condition is based on at least one of: (i) state boundaries, (ii) city boundaries, (iii) county boundaries, or (iv) zip code boundaries.

7. The method of claim 1, wherein the one or more network resources comprise at least one of: (i) a telecommunications-network antenna, (ii) a telecommunications network service location, or (iii) a telecommunications network site.

8. A system comprising:
   at least one hardware processor; and
   at least one non-transitory memory storing instructions, which, when executed by the at least one hardware processor, cause the system to:
   identify from a set of geographically-distinct areas, a proposed-split area, wherein the proposed-split area fails to satisfy a network-ready condition;
   temporarily split the proposed-split area into a set of geographically-distinct sub-areas using a geographical constraining condition;
   obtain, from a third-party resource, user mobility data indicating movement of user locations from a respective geographically-distinct sub-area of the set of geographically-distinct sub-areas to a geographic location, wherein the geographic location (i) satisfies the network-ready condition and (ii) is within a threshold distance of the respective geographically-distinct sub-area;
   determine a user-mobility metric for each geographically-distinct sub-area of the set of geographically-distinct sub-areas using the user-mobility data for the respective geographically-distinct sub-area;
   identify a subset of geographically-distinct sub-areas of the geographically-distinct sub-areas that satisfy the network-ready condition; and
   in response to the user-mobility metrics of at least one of the subset of geographically-distinct sub-areas satisfying a user mobility threshold value, (i) permanently split the proposed-split area into the set of geographically-distinct sub-areas and (ii) deploy one or more network resources to the subset of geographically-distinct sub-areas.

9. The system of claim 8, further comprising the instructions to:
   determine a number of the set of geographically-distinct sub-areas that satisfy the network-ready condition;
   in response to the number satisfying a network-ready condition threshold number, performing a second split of each geographically-distinct sub-area of the set of geographically-distinct sub-areas using a second geographical constraining condition to generate a second set of geographically-distinct sub-areas; and
   update the set of geographically-distinct sub-areas to the second set of geographically-distinct sub-areas.

10. The system of claim 8, further comprising the instructions to:
    determine a number of the set of geographically-distinct sub-areas that satisfy the network-ready condition; and
    in response to the number satisfying a network-ready condition threshold number, update the threshold distance to a second threshold distance that is less than that of the threshold distance.

11. The system of claim 8, further comprising the instructions to:
    determine a number of the set of geographically-distinct sub-areas that fail to satisfy the network-ready condition; and in response to the number failing to satisfy a network-ready condition threshold value, update the threshold distance to a second threshold distance that is greater than that of the threshold distance.

12. The system of claim 8, further comprising the instructions to:
   determine a population density of users in the proposed-split area; and
   access a database to determine the threshold distance using the population density of the users in the proposed-split areas, wherein the database comprises information mapping population densities to threshold distance values.

13. The system of claim 8, wherein the one or more network resources comprise at least one of: (i) a telecommunications-network antenna, (ii) a telecommunications network service location, or (iii) a telecommunications network site.

14. At least one non-transitory computer-readable storage medium storing instructions, which, when executed by at least one data processor of a system, cause the system to:
   identifying from a set of geographically-distinct areas, a proposed-split area, wherein the proposed-split area fails to satisfy a network-ready condition;
   temporarily splitting the proposed-split area into a set of geographically-distinct sub-areas using a geographical constraining condition;
   obtaining, from a third-party resource, user mobility data indicating movement of user locations from a respective geographically-distinct sub-area of the set of geographically-distinct sub-areas to a geographic location, wherein the geographic location (i) satisfies the network-ready condition and (ii) is within a threshold distance of the respective geographically-distinct sub-area;
   determining a user-mobility metric for each geographically-distinct sub-area of the set of geographically-distinct sub-areas using the user-mobility data for the respective geographically-distinct sub-area;
   identifying a subset of geographically-distinct sub-areas of at least one of the geographically-distinct sub-areas that satisfy the network-ready condition; and
   in response to the user-mobility metrics of the subset of geographically-distinct sub-areas satisfying a user mobility threshold value, (i) permanently splitting the proposed-split area into the set of geographically-distinct sub-areas and (ii) deploying one or more network resources to the subset of geographically-distinct sub-areas.

15. The non-transitory computer-readable storage medium of claim 14, further storing instructions, which, when executed by the at least one data processor of the system, cause the system to:
   determining a number of the set of geographically-distinct sub-areas that satisfy the network-ready condition;
   in response to the number satisfying a network-ready condition threshold number, performing a second split of each geographically-distinct sub-area of the set of geographically-distinct sub-areas using a second geographical constraining condition to generate a second set of geographically-distinct sub-areas; and
   updating the set of geographically-distinct sub-areas to the second set of geographically-distinct sub-areas.

16. The non-transitory computer-readable storage medium of claim 14, further storing instructions, which, when executed by the at least one data processor of the system, cause the system to:
   determining a number of the set of geographically-distinct sub-areas that satisfy the network-ready condition; and
   in response to the number satisfying a network-ready condition threshold number, updating the threshold distance to a second threshold distance that is less than that of the threshold distance.

17. The non-transitory computer-readable storage medium of claim 14, further storing instructions, which, when executed by the at least one data processor of the system, cause the system to:
   determining a number of the set of geographically-distinct sub-areas that fail to satisfy the network-ready condition; and
   in response to the number failing to satisfy a network-ready condition threshold value, updating the threshold distance to a second threshold distance that is greater than that of the threshold distance.

18. The non-transitory computer-readable storage medium of claim 14, further storing instructions, which, when executed by the at least one data processor of the system, cause the system to:
   determining a population density of users in the proposed-split area; and
   accessing a database to determine the threshold distance using the population density of the users in the proposed-split areas, wherein the database comprises information mapping population densities to threshold distance values.

19. The non-transitory computer-readable storage medium of claim 14, wherein the geographical constraining condition is based on at least one of: (i) state boundaries, (ii) city boundaries, (iii) county boundaries, or (iv) zip code boundaries.

20. The non-transitory computer-readable storage medium of claim 14, wherein the one or more network resources comprise at least one of: (i) a telecommunications-network antenna, (ii) a telecommunications network service location, or (iii) a telecommunications network site.

* * * * *